US011984134B2

(12) United States Patent
Hou et al.

(10) Patent No.: US 11,984,134 B2
(45) Date of Patent: May 14, 2024

(54) METHOD OF PROCESSING AUDIO DATA, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Jiankang Hou, Beijing (CN); Zhipeng Nie, Beijing (CN); Liqiang Zhang, Beijing (CN); Tao Sun, Beijing (CN); Lei Jia, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/071,187

(22) Filed: Nov. 29, 2022

(65) Prior Publication Data
US 2023/0087531 A1 Mar. 23, 2023

(30) Foreign Application Priority Data
Nov. 30, 2021 (CN) .......................... 202111454677.9

(51) Int. Cl.
*G10L 25/18* (2013.01)
*G10L 25/30* (2013.01)

(52) U.S. Cl.
CPC .............. *G10L 25/18* (2013.01); *G10L 25/30* (2013.01)

(58) Field of Classification Search
CPC ......... G10L 25/18; G10L 25/30; G10L 25/48; G10L 25/24; G10L 25/90; Y02D 30/70; H04N 21/439
See application file for complete search history.

(56) References Cited

U.S. PATENT DOCUMENTS 4,797,926 A * 1/1989 Bronson ................. G10L 25/90
  704/214
6,078,879 A * 6/2000 Taori ....................... G10L 25/90
  704/207
(Continued)

FOREIGN PATENT DOCUMENTS

CN    104538024    4/2015
CN    110085245    8/2019
(Continued)

OTHER PUBLICATIONS

Office Action dated Jul. 26, 2022, issued in corresponding Chinese Patent Application No. 202111454677.9, pp. 1-10.
(Continued)

*Primary Examiner* — Fariba Sirjani
(74) *Attorney, Agent, or Firm* — Pillsbury Winthrop Shaw Pittman, LLP (57) ABSTRACT

A method of processing audio data, an electronic device, and a storage medium, which relates to a field of artificial intelligence, in particular to a field of speech processing technology. The method includes: processing spectral data of the audio data to obtain a first feature information; obtaining a fundamental frequency indication information according to the first feature information, wherein the fundamental frequency indication information indicates valid audio data of the first feature information and invalid audio data of the first feature information; obtaining a fundamental frequency information and a spectral energy information according to the first feature information and the fundamental frequency indication information; and obtaining a harmonic structure information of the audio data according to the fundamental frequency information and the spectral energy information.

12 Claims, 7 Drawing Sheets

(56) References Cited

U.S. PATENT DOCUMENTS

| | | | | |
|---|---|---|---|---|
| 2004/0193407 | A1* | 9/2004 | Ramabadran | G10L 25/90 704/207 |
| 2011/0010168 | A1* | 1/2011 | Yu | G10L 19/12 704/219 |
| 2015/0025881 | A1* | 1/2015 | Carlos | G10L 21/0272 704/233 |
| 2015/0302845 | A1* | 10/2015 | Nakano | G10L 25/15 704/267 |
| 2019/0115037 | A1* | 4/2019 | Choo | G10L 21/038 |
| 2020/0294486 | A1* | 9/2020 | Daido | G10L 13/02 |
| 2023/0087531 | A1* | 3/2023 | Hou | G10L 25/48 704/232 |
| 2023/0099343 | A1* | 3/2023 | Wang | G10L 19/04 704/262 |
| 2023/0260535 | A1* | 8/2023 | Ingraito | G10L 25/63 704/270 |

FOREIGN PATENT DOCUMENTS

| | | |
|---|---|---|
| CN | 110718233 | 1/2020 |
| CN | 111833843 | 10/2020 |
| CN | 111986691 | 11/2020 |
| CN | 112634928 | 4/2021 |
| EP | 0260053 | 3/1988 |

OTHER PUBLICATIONS

Office Action dated Oct. 31, 2022, issued in corresponding Chinese Patent Application No. 202111454677.9, pp. 1-6.

European Search Report issued in corresponding European Patent Application No. 22210430.9, dated Mar. 30, 2023.

Michael L. Seltzer et al., "A Harmonic-Model-Based Front End for Robust Speech Recognition", Eurospeech, pp. 1277-1280 (2003).

* cited by examiner

METHOD OF PROCESSING AUDIO DATA, ELECTRONIC DEVICE AND STORAGE MEDIUM

This application claims priority to Chinese Patent Application No. 202111454677.9, filed on Nov. 30, 2021, which is incorporated herein in its entirety by reference.

TECHNICAL FIELD

The present disclosure relates to a field of artificial intelligence technology, and in particular, to a field of speech processing technology. More specifically, the present disclosure provides a method of processing audio data, an electronic device, and a storage medium.

BACKGROUND

Audio data may be decomposed into periodic data and aperiodic data. The periodic data may be harmonic structure information. The harmonic structure information is also an important part of audio data. The aperiodic data may be a background noise of audio.

SUMMARY

The present disclosure provides a method of processing audio data, an electronic device, and a storage medium.

According to an aspect, a method of processing audio data is provided, and the method includes: processing spectral data of the audio data to obtain a first feature information; obtaining a fundamental frequency indication information according to the first feature information, wherein the fundamental frequency indication information indicates valid audio data of the first feature information and invalid audio data of the first feature information; obtaining a fundamental frequency information and a spectral energy information according to the first feature information and the fundamental frequency indication information; and obtaining a harmonic structure information of the audio data according to the fundamental frequency information and the spectral energy information.

According to an aspect, an electronic device is provided, and the electronic device includes: at least one processor; and a memory communicatively connected to the at least one processor, wherein the memory stores instructions executable by the at least one processor, and the instructions, when executed by the at least one processor, are configured to cause the at least one processor to implement the method provided according to the present disclosure.

According to an aspect, a non-transitory computer-readable storage medium having computer instructions therein is provided, wherein the computer instructions are configured to cause a computer system to implement the method provided according to the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Periodic data may be decomposed from audio data. A sine wave component equal to a period of the periodic data is referred to as a fundamental wave component. A frequency of the fundamental wave component is referred to as a fundamental frequency. A sine wave component with a frequency equal to an integral multiple of the fundamental frequency is referred to as a harmonic. By adding the fundamental frequency and the harmonic, another periodic data may be obtained, and the another periodic data is a harmonic structure information of the audio data described above.

In related art, a harmonic structure information of audio data may be obtained in a purely mathematical method, for example, the harmonic structure information may be obtained by using a Phase Vocoder. However, this method has a large error, and a process of obtaining the harmonic structure information is non-derivative, so that the process cannot be jointly trained with a neural network model.

The harmonic structure information of audio data may also be obtained by using a deep learning network. For example, a fundamental frequency information, a global energy distribution information and a harmonic energy distribution information of the audio data may be extracted in parallel, so as to obtain the harmonic structure information. This method may effectively obtain the harmonic structure information from the audio data generated by musical instruments. However, the audio data generated by humans is more complex than the audio data generated by musical instruments. When using this method to obtain the harmonic structure information from the audio data generated by humans, there will be a large error.

Figure 1:
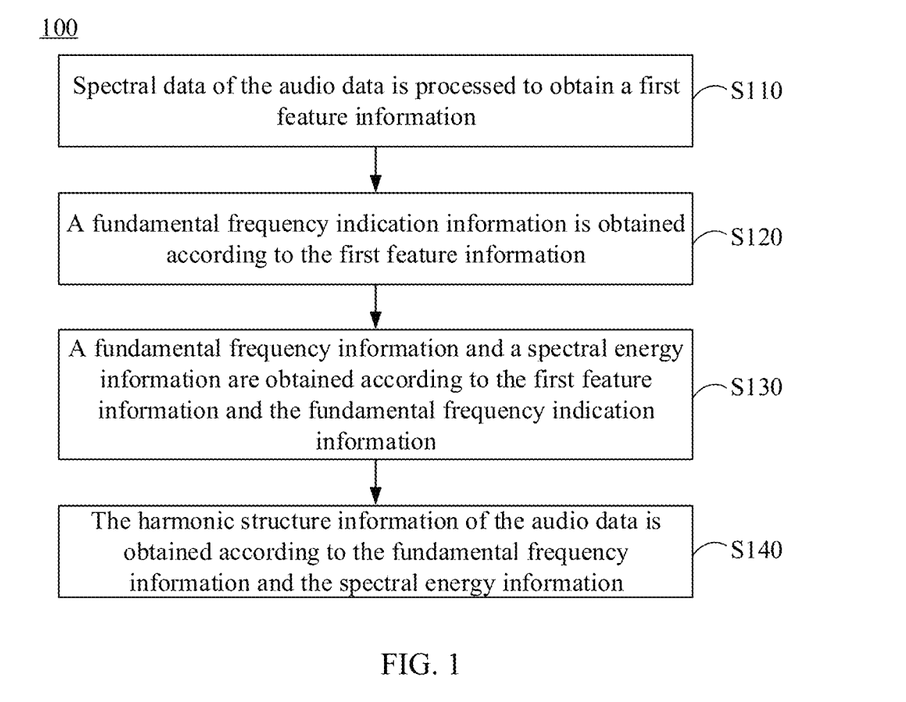
FIG. 1 shows a flowchart of a method of processing audio data according to an embodiment of the present disclosure.

FIG. 1 shows a flowchart of a method of processing audio data according to an embodiment of the present disclosure.

As shown in FIG. 1, the method 100 may include operations S110 to S140.

In operation S110, spectral data of the audio data is processed to obtain a first feature information.

For example, the audio data may be emitted by humans. In an example, when a user recites a specified sentence, audio recording is performed to obtain audio data.

For example, the spectral data may include Mel spectral data.

For example, a neural network model may be used to process the spectral data of the audio data to obtain a first feature information. In an example, the neural network model may be a residual neural network model, such as a Resnet-38 model or a Resnet-64 model.

In operation S120, a fundamental frequency indication information is obtained according to the first feature information.

In embodiments of the present disclosure, the fundamental frequency indication information indicates valid audio data of the first feature information and invalid audio data of the first feature information.

For example, the first feature information may be input into a fundamental frequency indication information detection model to obtain the fundamental frequency indication information. In an example, the fundamental frequency indication information detection model may be a convolution neural network (CNN) model.

Those skilled in the art may understand that, based on a customary habit of reciting, the user will pause when reciting the specified sentence to break the sentence. The audio data corresponding to a pause period may be the invalid audio data.

In operation S130, a fundamental frequency information and a spectral energy information are obtained according to the first feature information and the fundamental frequency indication information.

In embodiments of the present disclosure, a second feature information may be obtained according to the first feature information and the fundamental frequency indication information.

For example, the first feature information and the fundamental frequency indication information may be combined (fused) to obtain the second feature information.

In embodiments of the present disclosure, the second feature information is input into the fundamental frequency information detection model to obtain the fundamental frequency information.

For example, the fundamental frequency information detection model may be the neural network model. In an example, the fundamental frequency information detection model may be the convolution neural network model.

In embodiments of the present disclosure, a third feature information is obtained according to the first feature information, the fundamental frequency indication information and the fundamental frequency information.

For example, the first feature information, the fundamental frequency indication information and the fundamental frequency information may be combined to obtain the third feature information.

In embodiments of the present disclosure, the spectral energy information is obtained according to the third feature information.

For example, the spectral energy information includes a global energy information and a harmonic energy distribution information.

For example, the global energy information is obtained according to the third feature information. In an example, the third feature information may be input into the global energy information detection model to obtain the global energy information. In an example, the global energy information detection model may be the convolution neural network model.

For example, the harmonic energy distribution information is obtained according to the first feature information, the fundamental frequency indication information, the fundamental frequency information and the global energy information. In an example, the first feature information, the fundamental frequency indication information, the fundamental frequency information and the global energy information may be combined to obtain a fourth feature information. In an example, after obtaining the fourth feature information, the fourth feature information may be input into a harmonic energy distribution information detection model to obtain the harmonic energy distribution information. In an example, the harmonic energy distribution information detection model may be the convolution neural network model.

It should be noted that, a parameter of the harmonic energy distribution information detection model, a parameter of the above-mentioned global energy information detection model, a parameter of the above-mentioned fundamental frequency information detection model or a parameter of the above-mentioned fundamental frequency indication information detection model may be different from each other.

It should be noted that the above-mentioned combining process may be a concatenating process.

In operation S140, the harmonic structure information of the audio data is obtained according to the fundamental frequency information and the spectral energy information.

For example, the harmonic structure information may be obtained by a superposition of a set of sine waves.

For example, at an $n^{th}$ time instant, an energy information $A_k(n)$ of a sine wave may be obtained according to the global energy information and the harmonic energy distribution information by the following equation:

$$A_k(n)=A(n)c_k(n) \quad \text{(Equation 1)}$$

where $A(n)$ is the global energy information, and $c_k(n)$ is the harmonic energy distribution information.

A frequency $f_k(n)$ of each sine wave in the set of sine waves may be obtained according to the fundamental frequency by the following equation:

$$f_k(n)=kf_0(n) \quad \text{(Equation 2)}$$

where $f_0(n)$ is the fundamental frequency information, and k is the number of sine waves.

A phase $\Phi_k(n)$ of the sine wave may be obtained according to the frequency $f_k(n)$ of the sine wave by the following equation:

$$\Phi_k(n)=2\pi\Sigma_{m=0}^{n}f_k(m) \quad \text{(Equation 3)}$$

The harmonic structure information $x(n)$ may be obtained according to the phase $\Phi_k(n)$ and the energy information $A_k(n)$ by the following equation:

$$x(n)=\Sigma_{k=0}^{K-1}A_k(n)\sin(\Phi_k(n)) \quad \text{(Equation 4)}$$

Through embodiments of the present disclosure, outputs of the cascaded fundamental frequency indication information detection network, the fundamental frequency information detection network, the global energy information detection network, and the harmonic energy distribution information detection network are fully utilized, and errors of extracting the harmonic structure information from the audio data may be significantly reduced.

The harmonic structure information may be used to generate audio data, and there is almost no background noise in the harmonic structure information obtained according to the method 100. The audio data generated only based on the harmonic structure information is untrue, which is quite different from the real voice.

In some embodiments, the method of processing audio data described above may also include: obtaining a noise information in the audio data according to the first feature information; and obtaining synthetic audio data according to the harmonic structure information and the noise information.

For example, any filtering model may be used to filter out the periodic data from the first feature information to obtain the noise information in the audio data.

For example, according to the harmonic structure information and the noise information, the synthetic audio data may be obtained in any way. In an example, the harmonic structure information may be used as an audio without background noise. The synthetic audio data obtained by superimposing the harmonic structure information and the noise information is closer to the normal voice.

Figure 2A:
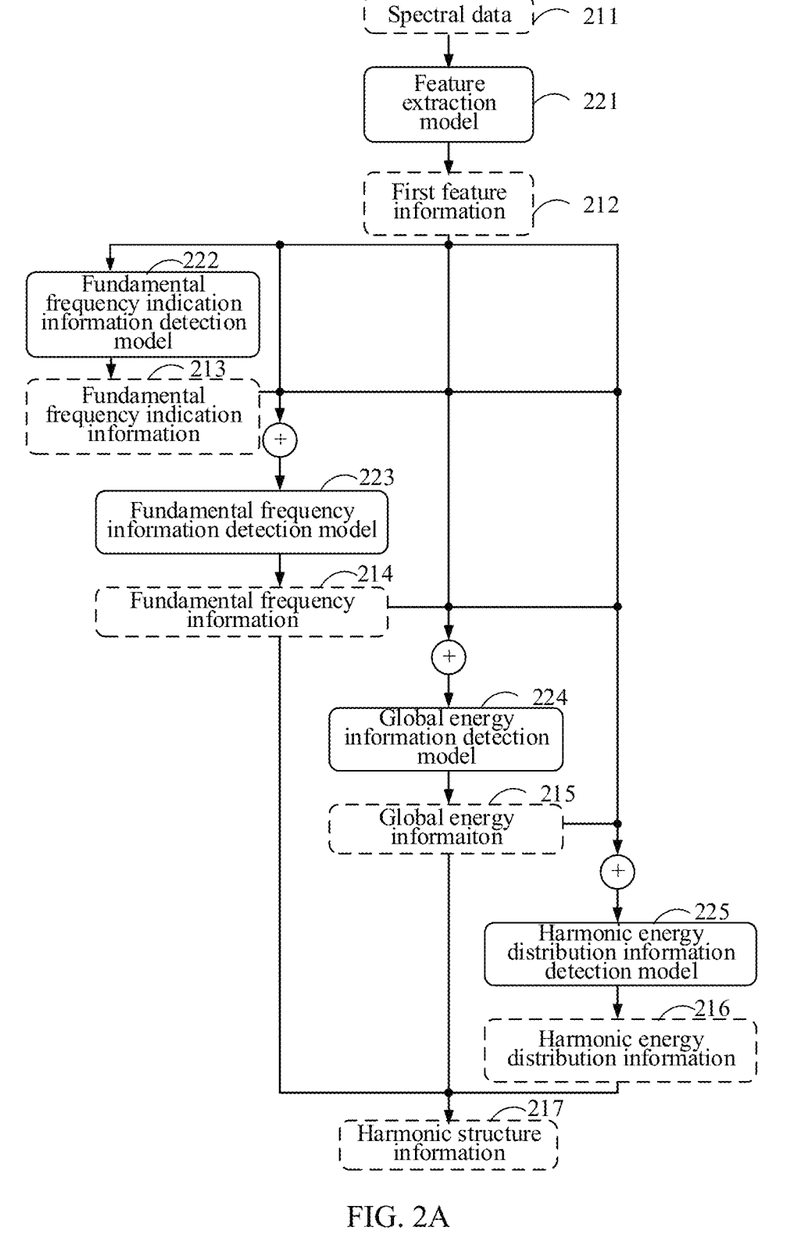
FIG. 2A shows a schematic diagram of a method of processing audio data according to an embodiment of the present disclosure.

FIG. 2A shows a schematic diagram of a method of processing audio data according to an embodiment of the present disclosure.

As shown in FIG. 2A, the spectral data 211 may be input into a feature extraction model 221 for processing to obtain a first feature information 212. The feature extraction model 221 may be a residual neural network model, such as a Resnet-64 model. The first feature information 212 may be a 2×N feature vector.

The first feature information 212 may be input into a fundamental frequency indication information detection model 222 to obtain a fundamental frequency indication information 213. The fundamental frequency indication information 213 may be a 1×N feature vector.

The fundamental frequency indication information 213 and the first feature information 212 may be concatenated to obtain a second feature information. The second feature information is input into a fundamental frequency information detection model 223 to obtain a fundamental frequency information 214. The second feature information may be a 3×N feature vector, and the fundamental frequency information 214 may be a 2×N feature vector.

The fundamental frequency information 214, the fundamental frequency indication information 213 and the first feature information 212 may be concatenated to obtain a third feature information. The third feature information is input into a global energy information detection model 224 to obtain a global energy information 215. The third feature information may be a 5×N feature vector, and the global energy information 215 may be a 2×N feature vector.

The global energy information 215, the fundamental frequency information 214, the fundamental frequency indication information 213 and the first feature information 212 may be concatenated to obtain a fourth feature information. The fourth feature information is input into a harmonic energy distribution information detection model 225 to obtain a harmonic energy distribution information 216. The fourth feature information may be a 7×N feature vector, and the harmonic energy distribution information 216 may be a 2×N feature vector.

Next, a harmonic structure information 217 may be obtained according to the harmonic energy distribution information 216, the global energy information 215, and the fundamental frequency information 214. For example, the harmonic structure information 217 may be obtained by using the above-mentioned equations 1 to 4 according to the harmonic energy distribution information 216, the global energy information 215 and the fundamental frequency information 214.

Figure 2B:
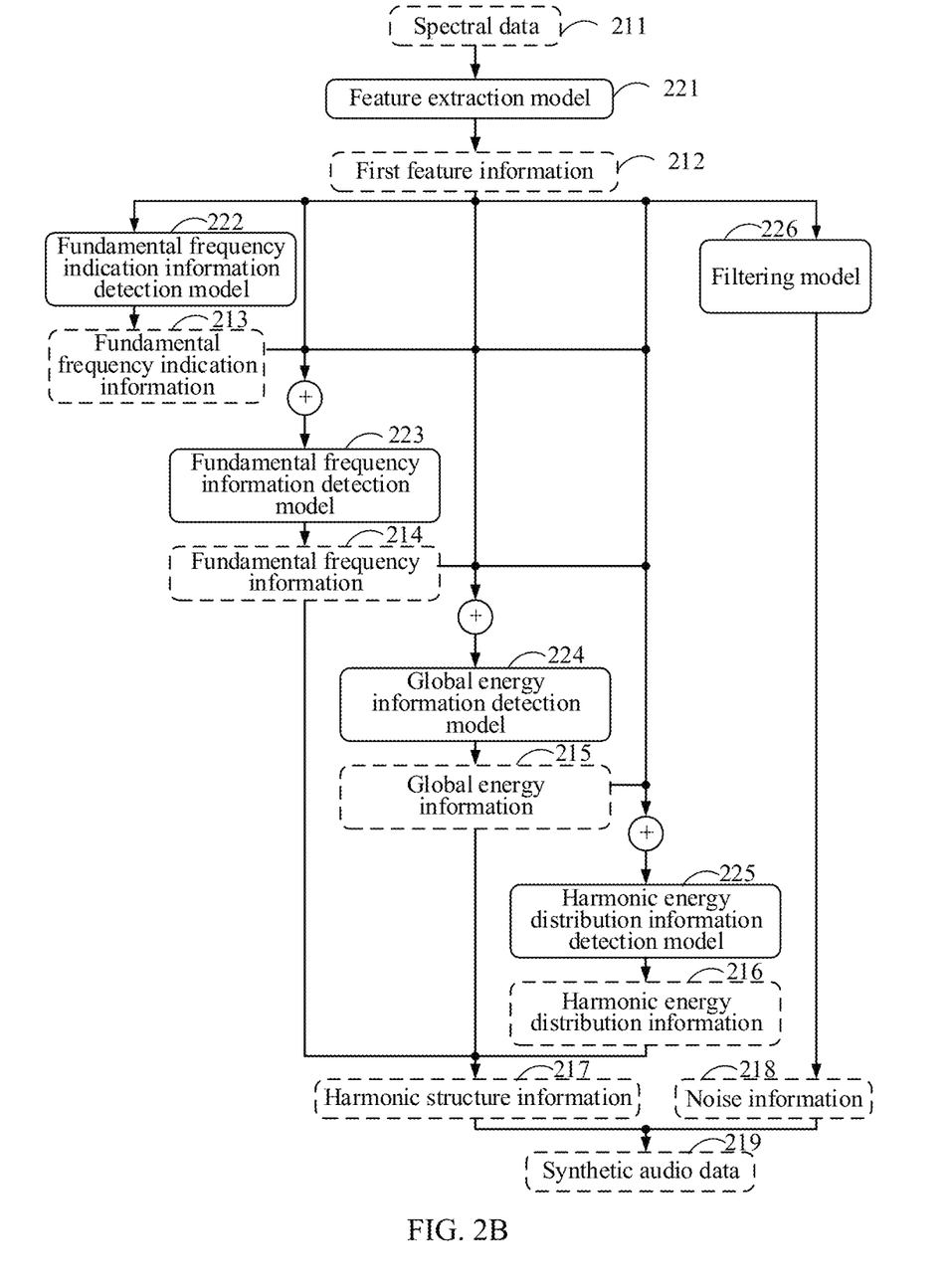
FIG. 2B shows a schematic diagram of a method of processing audio data according to another embodiment of the present disclosure.

FIG. 2B shows a schematic diagram of a method of processing audio data according to another embodiment of the present disclosure.

As shown in FIG. 2B, a difference from that shown in FIG. 2A is that in this example, when or after the first feature information 212 is input into the fundamental frequency indication information detection model 222, the first feature information 212 may be input into a filtering model 226 to obtain a noise information 218. In an example, the filtering model 226 may filter out the periodic data in the first feature information 212 to obtain an aperiodic feature information. Moreover, the filtering model 226 may also combine the aperiodic feature information with a preset white noise information to obtain the noise information 218.

After obtaining the harmonic structure information 217, the harmonic structure information 217 may be combined with the noise information 218 to obtain synthetic audio data 219.

Figure 3:
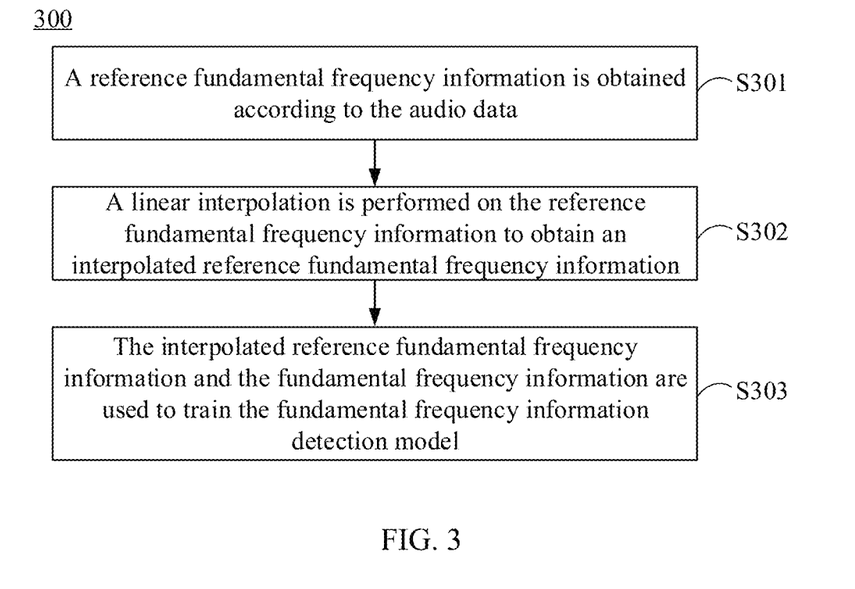
FIG. 3 shows a flowchart of training a fundamental frequency information detection model according to an embodiment of the present disclosure.

FIG. 3 shows a flowchart of a method of processing audio data according to another embodiment of the present disclosure.

As shown in FIG. 3, the method 300 may include operations S301 to S303.

For example, the method 300 may be performed before operation S110 of the method 100.

In operation S301, a reference fundamental frequency information is obtained according to the audio data.

For example, the reference fundamental frequency information may be extracted from the audio data.

In operation S302, a linear interpolation is performed on the reference fundamental frequency information to obtain an interpolated reference fundamental frequency information.

For example, when the linear interpolation is performed, a function used for interpolating may be a linear polynomial (polynomial of degree one). The reference fundamental frequency information after being linear interpolated may become smoother.

In operation S303, the fundamental frequency information and the interpolated reference fundamental frequency information are used to train the fundamental frequency information detection model.

In embodiments of the present disclosure, the fundamental frequency information detection model is trained, so that a difference between the interpolated reference fundamental frequency information and the fundamental frequency information is less than a predetermined threshold.

For example, the difference between the interpolated reference fundamental frequency information and the fundamental frequency information may be obtained by using an L1 loss function according to the interpolated reference fundamental frequency information and the fundamental frequency information. According to the difference, a parameter of the fundamental frequency information detection model is adjusted to train the model.

Through embodiments of the disclosure, the fundamental frequency information detection model is trained by using the smoothed and linearly interpolated reference fundamental frequency information, so that the trained fundamental frequency information detection model may be used to extract a smoother fundamental frequency information.

For ease of understanding, the difference between the interpolated reference fundamental frequency information and the fundamental frequency information is expressed as a first difference, and the above-mentioned predetermined threshold is expressed as a first predetermined threshold.

In some embodiments, the reference fundamental frequency indication information may be obtained according to the audio data. According to the reference fundamental frequency indication information and the fundamental frequency indication information, the fundamental frequency indication information detection model is trained, so that a second difference between the reference fundamental frequency indication information and the fundamental frequency information is less than a second predetermined threshold.

For example, the above-mentioned second difference may be obtained by the using the L1 loss function according to the reference fundamental frequency indication information and the fundamental frequency indication information.

In some embodiments, the global energy information detection model and/or the harmonic energy distribution information detection model may be trained according to the audio data and the synthetic audio data, so that a third difference between the audio data and the synthetic audio data is less than a third predetermined threshold.

For example, the above-mentioned third difference may be obtained by using STFT (Short-Time Fourier Transform) loss function according to the audio data and the synthetic audio data.

Figure 4A:
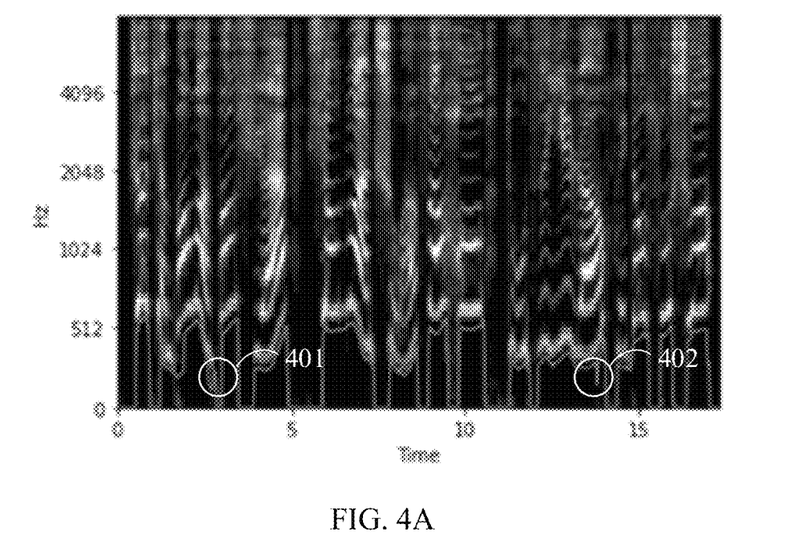
FIG. 4A shows a schematic diagram of a reference fundamental frequency information according to an embodiment of the present disclosure.

FIG. 4A shows a schematic diagram of a reference fundamental frequency information according to an embodiment of the present disclosure.

As shown in FIG. 4A, the reference fundamental frequency information has a non-smoothing problem. For example, a depression exists in a region 401, and a protrusion exists in a region 402.

Figure 4B:
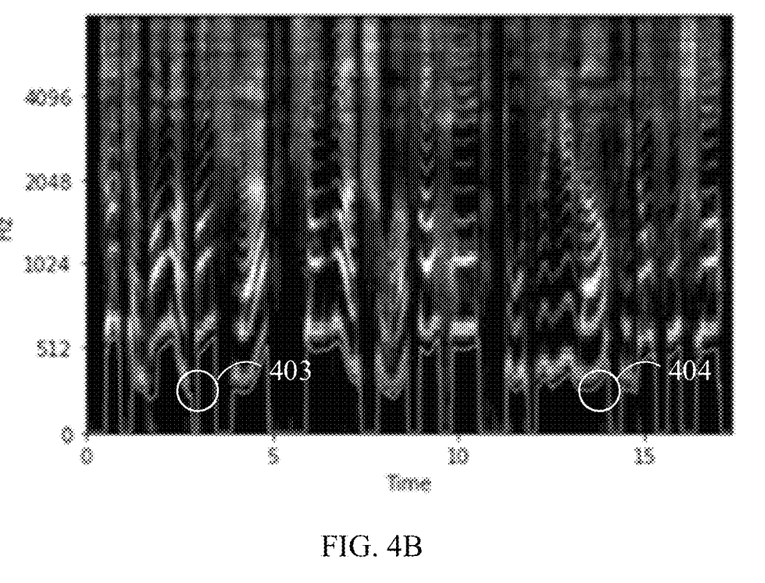
FIG. 4B shows a schematic diagram of an interpolated reference fundamental frequency information according to an embodiment of the present disclosure.

FIG. 4B shows a schematic diagram of an interpolated reference fundamental frequency information according to an embodiment of the present disclosure.

As shown in FIG. 4B, the interpolated reference fundamental frequency information is smoother than the reference fundamental frequency information. For example, no depression exists in a region 403, and no protrusion exists in a region 404. The region 403 corresponds to the region 401 shown in FIG. 4A, and the region 404 corresponds to the region 402 shown in FIG. 4A.

Figure 5:
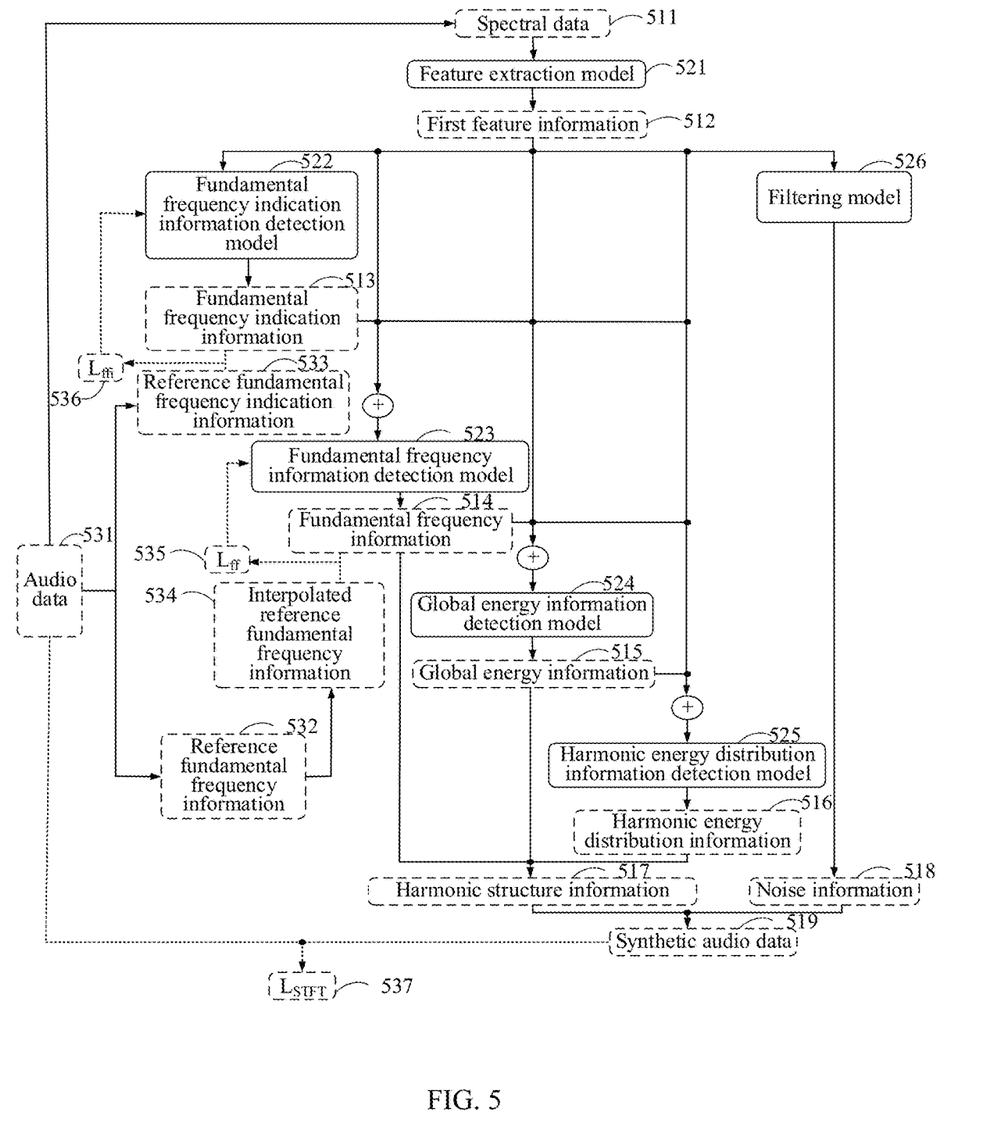
FIG. 5 shows a schematic diagram of a method of processing audio data according to another embodiment of the present disclosure.

FIG. 5 shows a schematic diagram of training a fundamental frequency information detection model according to an embodiment of the present disclosure.

As shown in FIG. 5, spectral data 511 may be obtained according to the audio data 531. The reference fundamental frequency information 532 may be obtained according to the audio data 531. The reference fundamental frequency indication information 533 may be obtained according to the audio data 531.

A linear interpolation is performed on the reference fundamental frequency information 532 to obtain an interpolated reference fundamental frequency information 534. In an example, the reference fundamental frequency information 532 may be, for example, the reference fundamental frequency information shown in FIG. 4A, and the interpolated reference fundamental frequency information 534 may be, for example, the interpolated reference fundamental frequency information shown in FIG. 4B.

The spectral data 511 may be input into a feature extraction model 521 for processing to obtain a first feature information 512. The feature extraction model 521 may be a residual neural network model, such as a Resnet-64 model.

The first feature information 512 may be input into the fundamental frequency indication information detection model 522 to obtain the fundamental frequency indication information 513. A first difference $L_{fi}$ 536 may be obtained by using the L1 loss function according to the reference fundamental frequency indication information 533 and the fundamental frequency indication information 513. A parameter of the fundamental frequency indication information detection model 522 may be adjusted according to the first difference $L_{fi}$ 536 to train the fundamental frequency indication information detection model 522.

The fundamental frequency indication information 513 and the first feature information 512 may be concatenated to obtain a second feature information. The second feature information is input into the fundamental frequency information detection model 523 to obtain the fundamental frequency information 514. A second difference $L_{ff}$ 535 may be obtained by using the L1 loss function according to the fundamental frequency information 514 and the interpolated reference fundamental frequency information 534. A parameter of the fundamental frequency information detection model 523 may be adjusted according to the second difference $L_{ff}$ 535 to train the fundamental frequency information detection model 523.

The fundamental frequency information 514, the fundamental frequency indication information 513 and the first feature information 512 may be concatenated to obtain a third feature information. The third feature information is input into the global energy information detection model 524 to obtain a global energy information 515.

The global energy information 515, the fundamental frequency information 514, the fundamental frequency indication information 513 and the first feature information 512 may be concatenated to obtain a fourth feature information. The fourth feature information is input into a harmonic energy distribution information detection model 525 to obtain a harmonic energy distribution information 516.

Next, a harmonic structure information 517 may be obtained according to the harmonic energy distribution information 516, the global energy information 515 and the fundamental frequency information 514. For example, the harmonic structure information 517 may be obtained by using the above-mentioned equations 1 to 4 according to the harmonic energy distribution information 516, the global energy information 515 and the fundamental frequency information 514.

The first feature information 512 may be input into a filtering model 526 to obtain a noise information 518. The harmonic structure information 517 may be combined with the noise information 518 to obtain synthetic audio data 519.

A third difference $L_{STFT}$ 537 may be obtained by using the STFT loss function according to the audio data 531 and the synthetic audio data 519. A parameter of the global energy information detection model 524 and a parameter of the harmonic energy distribution information detection model 525 may be respectively adjusted according to the third difference $L_{STFT}$ 537 to train the two models.

In this example, dimensions of the first feature information 512, the fundamental frequency indication information 513, the fundamental frequency information 514, the global energy information 515, the second feature information, the third feature information and the fourth feature information may refer to the first feature information 212, the fundamental frequency indication information 213, the fundamental frequency information 214, the global energy information 215, the second feature information, the third feature information and the fourth feature information described above, which will not be repeated here.

Figure 6:
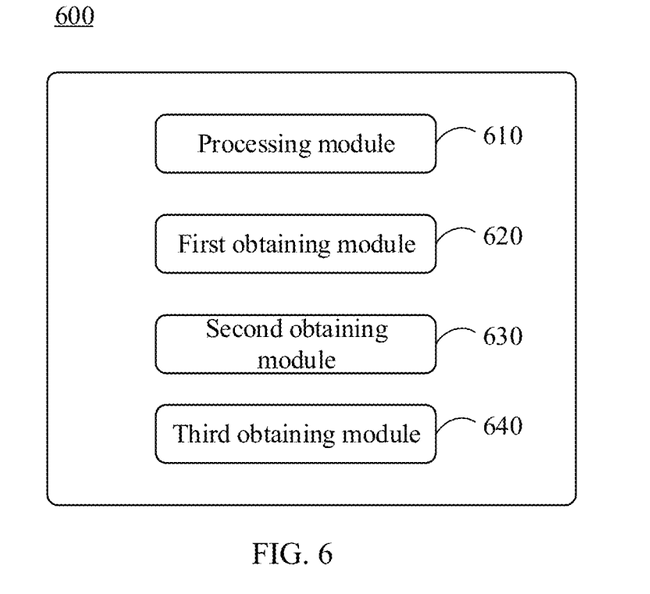
FIG. 6 is a block diagram of an apparatus of processing audio data according to an embodiment of the present disclosure.

FIG. 6 is a block diagram of an apparatus of processing audio data according to an embodiment of the present disclosure.

As shown in FIG. 6, the apparatus 600 may include a processing module 610, a first obtaining module 620, a second obtaining module 630, and a third obtaining module 640.

The processing module 610 is used to process spectral data of audio data to obtain a first feature information.

The first obtaining module 620 is used to obtain a fundamental frequency indication information according to the above-mentioned first feature information, and the above-mentioned fundamental frequency indication information indicates valid audio data of the above-mentioned first feature information and invalid audio data of the first feature information.

The second obtaining module 630 is used to obtain a fundamental frequency information and a spectral energy information according to the above-mentioned first feature information and the fundamental frequency indication information.

The third obtaining module 640 is used to obtain a harmonic structure information of the above-mentioned audio data according to the above-mentioned fundamental frequency information and the spectral energy information.

In some embodiments, the above-mentioned second obtaining module includes: a first obtaining sub-module used to obtain a second feature information according to the above-mentioned first feature information and the fundamental frequency indication information; and an input sub-module used to input the above-mentioned second feature information into a fundamental frequency information detection model to obtain the fundamental frequency information.

In some embodiments, the apparatus 600 further includes: a fourth obtaining module used to obtain a reference fundamental frequency information according to the above-mentioned audio data; a linear interpolating module used to perform a linear interpolation on the above-mentioned reference fundamental frequency information to obtain an interpolated reference fundamental frequency information; and a training module used to train the above-mentioned fundamental frequency information detection model by using the above-mentioned interpolated reference fundamental frequency information and the above-mentioned fundamental frequency information, so that a difference between the above-mentioned interpolated reference fundamental frequency information and the above-mentioned fundamental frequency information is less than a predetermined threshold.

In some embodiments, the above-mentioned second obtaining module further includes: a second obtaining sub-module used to obtain a third feature information according to the above-mentioned first feature information, the fundamental frequency indication information and the fundamental frequency information; and a third obtaining sub-module used to obtain the spectral energy information according to the above-mentioned third feature information.

In some embodiments, the above-mentioned spectral energy information includes a global energy information and a harmonic energy distribution information. And the above-mentioned third obtaining sub-module includes: a first obtaining unit used to obtain the global energy information according to the above-mentioned third feature information; and a second obtaining unit used to obtain the harmonic energy distribution information according to the first feature information, the fundamental frequency indication information, the fundamental frequency information and the global energy information.

In some embodiments, the apparatus 600 further includes: a fifth obtaining module used to obtain a noise information in the above-mentioned audio data according to the above-mentioned first feature information; and a sixth obtaining module used to obtain synthetic audio data according to the above-mentioned harmonic structure information and the noise information.

In some embodiments, the above-mentioned spectral data includes Mel spectral data.

In the technical solution of the present disclosure, the collection, storage, use, processing, transmission, provision, disclosure and application of user speech information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

According to embodiments of the present disclosure, the present disclosure further provides an electronic device, a readable storage medium, and a computer program product.

Figure 7:
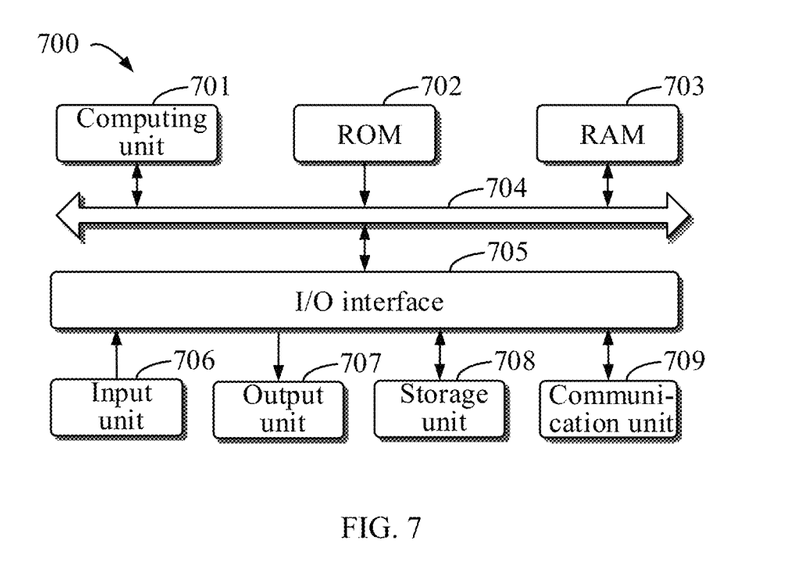
FIG. 7 is a block diagram of an electronic device for implementing a method of processing audio data according to an embodiment of the present disclosure.

FIG. 7 shows a schematic block diagram of an example electronic device 900 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 may include a computing unit 701, which may perform various appropriate actions and processing based on a computer program stored in a read only memory (ROM) 702 or a computer program loaded from a storage unit 708 into a random access memory (RAM) 703. Various programs and data required for the operation of the electronic device 700 may be stored in the RAM 703. The computing unit 701, the ROM 702 and the RAM 703 are connected to each other through a bus 704. An input/output (I/O) interface 705 is also connected to the bus 704.

Various components in the electronic device 700 are connected to the I/O interface 705, including an input unit 706, such as a keyboard, a mouse, etc.; an output unit 707, such as various types of displays, speakers, etc.; a storage unit 708, such as a magnetic disk, an optical disk, etc.; and a communication unit 709, such as a network card, a modem, a wireless communication transceiver, etc. The communication unit 709 allows the electronic device 700 to exchange information/data with other devices through a computer network such as the Internet and/or various telecommunication networks.

The computing unit 701 may be various general-purpose and/or dedicated processing components with processing and computing capabilities. Some examples of the computing unit 701 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 701 may perform the various methods and processes described above, such as the method of processing audio data. For example, in some embodiments, the method of processing audio data may be implemented as a computer software program that is tangibly contained on a machine-readable medium, such as a storage unit 708. In some embodiments, part or all of a computer program may be loaded and/or installed on the electronic device 700 via the ROM 702 and/or the communication unit 709. When the computer program is loaded into the RAM 703 and executed by the computing unit 701, one or more steps of the method of processing audio data described above may be performed. Alternatively, in other embodiments, the computing unit 701 may be configured to perform the method of processing audio data in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing audio data, the method comprising:

inputting spectral data of the audio data into a feature extraction model to obtain a first feature vector;
inputting the first feature vector into a periodic/aperiodic indicator detection model to obtain a periodic/aperiodic indicator, wherein the periodic/aperiodic indicator is a feature vector indicating periodic audio data of the first feature vector and aperiodic audio data of the first feature vector;
concatenating the first feature vector and the periodic/aperiodic indicator to obtain a second feature vector;
inputting the second feature vector into a fundamental frequency detection model to obtain a fundamental frequency;
concatenating the first feature vector, the periodic/aperiodic indicator and the fundamental frequency to obtain a third feature vector;
obtaining a spectral energy according to the third feature vector;
obtaining a harmonic structure of the audio data according to the fundamental frequency and the spectral energy;
obtaining a noise information in the audio data according to the first feature vector; and
obtaining synthetic audio data according to the harmonic structure and the noise information.

2. The method of claim 1, further comprising:
obtaining a reference fundamental frequency according to the audio data;
performing a linear interpolation on the reference fundamental frequency to obtain an interpolated reference fundamental frequency; and
training the fundamental frequency detection model by using the fundamental frequency and the interpolated reference fundamental frequency, so that a difference between the interpolated reference fundamental frequency and the fundamental frequency is less than a predetermined threshold.

3. The method of claim 1, wherein the spectral energy comprises a global energy and a harmonic energy distribution, and the obtaining the spectral energy according to the third feature vector comprises:
obtaining the global energy according to the third feature vector; and
obtaining the harmonic energy distribution according to the first feature vector, the periodic/aperiodic indicator, the fundamental frequency and the global energy.

4. The method of claim 1, wherein the spectral data comprises Mel spectral data.

5. An electronic device comprising:
at least one processor; and
a memory communicatively connected to the at least one processor, wherein the memory stores instructions executable by the at least one processor, and the instructions, when executed by the at least one processor, are configured to cause the at least one processor to at least:
input spectral data of audio data into a feature extraction model to obtain a first feature vector;
input the first feature vector into a periodic/aperiodic indicator detection model to obtain a periodic/aperiodic indicator, wherein the periodic/aperiodic indicator is a feature vector indicating periodic audio data of the first feature vector and aperiodic audio data of the first feature vector;
concatenate the first feature vector and the periodic/aperiodic indicator to obtain a second feature vector;
input the second feature vector into a fundamental frequency detection model to obtain a fundamental frequency;
concatenate the first feature vector, the periodic/aperiodic indicator and the fundamental frequency to obtain a third feature vector;
obtain a spectral energy according to the third feature vector;
obtain a harmonic structure of the audio data according to the fundamental frequency and the spectral energy;
obtain a noise information in the audio data according to the first feature vector; and
obtain synthetic audio data according to the harmonic structure and the noise information.

6. The electronic device according to claim 5, wherein the instructions are further configured to cause the at least one processor to at least:
obtain a reference fundamental frequency according to the audio data;
perform a linear interpolation on the reference fundamental frequency to obtain an interpolated reference fundamental frequency; and
train the fundamental frequency detection model by using the fundamental frequency and the interpolated reference fundamental frequency, so that a difference between the interpolated reference fundamental frequency and the fundamental frequency is less than a predetermined threshold.

7. The electronic device according to claim 5, wherein the spectral energy comprises a global energy and a harmonic energy distribution, and wherein the instructions are further configured to cause the at least one processor to at least:
obtain the global energy according to the third feature vector; and
obtain the harmonic energy distribution according to the first feature vector, the periodic/aperiodic indicator, the fundamental frequency and the global energy.

8. The electronic device according to claim 5, wherein the spectral data comprises Mel spectral data.

9. A non-transitory computer-readable storage medium having computer instructions therein, the computer instructions configured to cause a computer system to at least:
input spectral data of audio data into a feature extraction model to obtain a first feature vector;
input the first feature vector into a periodic/aperiodic indicator detection model to obtain a periodic/aperiodic indicator, wherein the periodic/aperiodic indicator is a feature vector indicating periodic audio data of the first feature vector and aperiodic audio data of the first feature vector;
concatenate the first feature vector and the periodic/aperiodic indicator to obtain a second feature vector;
input the second feature vector into a fundamental frequency detection model to obtain a fundamental frequency;
concatenate the first feature vector, the periodic/aperiodic indicator and the fundamental frequency to obtain a third feature vector;
obtain a spectral energy according to the third feature vector;
obtain a harmonic structure of the audio data according to the fundamental frequency and the spectral energy;
obtain a noise information in the audio data according to the first feature vector; and
obtain synthetic audio data according to the harmonic structure and the noise information.

10. The non-transitory computer-readable storage medium according to claim 9, wherein the instructions are further configured to cause the computer system to at least:
- obtain a reference fundamental frequency according to the audio data;
- perform a linear interpolation on the reference fundamental frequency to obtain an interpolated reference fundamental frequency; and
- train the fundamental frequency detection model by using the fundamental frequency and the interpolated reference fundamental frequency, so that a difference between the interpolated reference fundamental frequency and the fundamental frequency is less than a predetermined threshold.

11. The non-transitory computer-readable storage medium according to claim 9, wherein the spectral energy comprises a global energy and a harmonic energy distribution, and wherein the instructions are further configured to cause the computer system to at least:
- obtain the global energy according to the third feature vector; and
- obtain the harmonic energy distribution according to the first feature vector, the periodic/aperiodic indicator, the fundamental frequency and the global energy.

12. The non-transitory computer-readable storage medium according to claim 9, wherein the spectral data comprises Mel spectral data.

* * * * *